US012244660B2

(12) United States Patent
Suri

(10) Patent No.: US 12,244,660 B2
(45) Date of Patent: Mar. 4, 2025

(54) SYSTEMS AND METHODS FOR ADAPTIVE BUFFERING FOR DIGITAL VIDEO STREAMING

(71) Applicant: DIVX, LLC, San Diego, CA (US)

(72) Inventor: Amit Bhimsen Suri, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 42 days.

(21) Appl. No.: 15/409,443

(22) Filed: Jan. 18, 2017

(65) Prior Publication Data

US 2018/0069909 A1 Mar. 8, 2018

Related U.S. Application Data

(60) Provisional application No. 62/385,065, filed on Sep. 8, 2016.

(51) Int. Cl.
*H04L 65/75* (2022.01)
*G11B 27/00* (2006.01)
(Continued)

(52) U.S. Cl.
CPC .......... *H04L 65/762* (2022.05); *G11B 27/005* (2013.01); *H04L 65/612* (2022.05);
(Continued)

(58) Field of Classification Search
CPC . H04L 65/602; H04L 65/4084; H04L 65/607; H04L 67/02; H04L 67/2857;
(Continued)

(56) References Cited

U.S. PATENT DOCUMENTS

| 5,400,401 A | 3/1995 | Wasilewski et al. |
| 5,574,785 A | 11/1996 | Ueno et al. |

(Continued)

FOREIGN PATENT DOCUMENTS

| CA | 2237293 A1 | 7/1997 |
| CN | 102577192 A | 7/2012 |

(Continued)

OTHER PUBLICATIONS

"MPEG-2, Part 1, ISO/IEC 13818-1", Information technology—Generic Coding of Moving Pictures and Associated Audio: Systems, 161 pgs, Nov. 13, 1994.

(Continued)

*Primary Examiner* — Jerry B Dennison
(74) *Attorney, Agent, or Firm* — KPPB LLP

(57) ABSTRACT

Systems and methods for adaptive buffering in accordance with embodiments of the invention enable a reduced minimum buffer time. One embodiment includes a playback device comprising a memory; a network interface; and a processor that reads instructions stored in the memory that directs the processor to: download digital video content in a buffer of a playback device; receive a minimum buffer time from the digital video content; play the digital video content at a slow motion speed using the playback device; reduce the minimum buffer time by a slow motion playback speed factor; continue playing the digital video content at the slow motion speed until the reduced minimum buffer time is reached using the playback device; and play the digital video content at a speed faster than the slow motion speed once the minimum buffer time is reached using the playback device.

15 Claims, 4 Drawing Sheets

(51) Int. Cl.
    *H04L 65/612* (2022.01)
    *H04L 65/70* (2022.01)
    *H04L 67/02* (2022.01)
    *H04L 67/5683* (2022.01)
    *H04N 21/438* (2011.01)
    *H04N 21/44* (2011.01)
    *H04N 21/2343* (2011.01)
    *H04N 21/845* (2011.01)

(52) U.S. Cl.
    CPC ............ *H04L 65/70* (2022.05); *H04L 67/02* (2013.01); *H04L 67/5683* (2022.05); *H04N 21/4384* (2013.01); *H04N 21/44004* (2013.01); *H04N 21/23439* (2013.01); *H04N 21/8456* (2013.01)

(58) Field of Classification Search
    CPC ....... H04L 65/752; H04L 65/60; H04L 65/80; H04L 65/65; H04L 65/756; H04L 67/04; H04L 47/263; H04L 47/38; H04L 49/90; H04L 65/1089; H04N 21/4384; H04N 21/44004; H04N 21/23439; H04N 21/8456; H04N 21/2402; H04N 21/2387; H04N 21/2401; G11B 27/005
    See application file for complete search history.

(56) References Cited

U.S. PATENT DOCUMENTS

| | | |
|---|---|---|
| 5,600,721 A | 2/1997 | Kitazato |
| 5,621,794 A | 4/1997 | Matsuda et al. |
| 5,642,338 A | 6/1997 | Fukushima et al. |
| 5,805,700 A | 9/1998 | Nardone et al. |
| 5,813,010 A | 9/1998 | Kurano et al. |
| 5,854,873 A | 12/1998 | Mori et al. |
| 5,907,658 A | 5/1999 | Murase et al. |
| 5,923,869 A | 7/1999 | Kashiwagi et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,057,832 A | 5/2000 | Lev et al. |
| 6,065,050 A | 5/2000 | DeMoney |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,351,538 B1 | 2/2002 | Uz |
| 6,373,803 B2 | 4/2002 | Ando et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,594,699 B1 | 7/2003 | Sahai et al. |
| 6,654,933 B1 | 11/2003 | Abbott et al. |
| 6,665,751 B1* | 12/2003 | Chen ............... H04N 21/23406 365/191 |
| 6,671,408 B1 | 12/2003 | Kaku |
| 6,690,838 B2 | 2/2004 | Zhou |
| 6,724,944 B1 | 4/2004 | Kalevo et al. |
| 6,751,623 B1 | 6/2004 | Basso et al. |
| 6,813,437 B2 | 11/2004 | Ando et al. |
| 6,871,006 B1 | 3/2005 | Oguz et al. |
| 6,912,513 B1 | 6/2005 | Candelore |
| 6,931,531 B1 | 8/2005 | Takahashi |
| 6,957,350 B1 | 10/2005 | Demos |
| 6,970,564 B1 | 11/2005 | Kubota et al. |
| 6,983,079 B2 | 1/2006 | Kim |
| 7,006,757 B2 | 2/2006 | Ando et al. |
| 7,007,170 B2 | 2/2006 | Morten |
| 7,020,287 B2 | 3/2006 | Unger |
| 7,151,832 B1 | 12/2006 | Fetkovich et al. |
| 7,188,183 B1 | 3/2007 | Paul et al. |
| 7,212,726 B2 | 5/2007 | Zetts |
| 7,242,772 B1 | 7/2007 | Tehranchi |
| 7,274,861 B2 | 9/2007 | Yahata et al. |
| 7,295,673 B2 | 11/2007 | Grab et al. |
| 7,349,886 B2 | 3/2008 | Morten et al. |
| 7,352,956 B1 | 4/2008 | Winter et al. |
| 7,382,879 B1 | 6/2008 | Miller |
| 7,397,853 B2 | 7/2008 | Kwon et al. |
| 7,400,679 B2 | 7/2008 | Kwon et al. |
| 7,418,132 B2 | 8/2008 | Hoshuyama |
| 7,457,415 B2 | 11/2008 | Reitmeier et al. |
| 7,499,930 B2 | 3/2009 | Naka et al. |
| 7,546,641 B2 | 6/2009 | Robert et al. |
| 7,639,921 B2 | 12/2009 | Seo et al. |
| 7,640,435 B2 | 12/2009 | Morten |
| 7,711,052 B2 | 5/2010 | Hannuksela et al. |
| 7,853,980 B2 | 12/2010 | Pedlow, Jr. et al. |
| 7,864,186 B2 | 1/2011 | Robotham et al. |
| 7,945,143 B2 | 5/2011 | Yahata et al. |
| 8,131,875 B1 | 3/2012 | Chen |
| 8,169,916 B1 | 5/2012 | Pai et al. |
| 8,243,924 B2 | 8/2012 | Chen et al. |
| 8,286,213 B2 | 10/2012 | Seo |
| 8,312,079 B2 | 11/2012 | Newsome et al. |
| 8,315,509 B2 | 11/2012 | Witham |
| 8,369,421 B2 | 2/2013 | Kadono et al. |
| 8,649,669 B2 | 2/2014 | Braness et al. |
| 8,683,066 B2 | 3/2014 | Hurst et al. |
| 8,782,268 B2 | 7/2014 | Pyle et al. |
| 8,819,116 B1 | 8/2014 | Tomay et al. |
| 8,849,950 B2 | 9/2014 | Stockhammer et al. |
| 9,038,116 B1 | 5/2015 | Knox et al. |
| 9,602,846 B1* | 3/2017 | Martel ............... H04N 21/2365 |
| 2001/0021276 A1 | 9/2001 | Zhou |
| 2001/0052077 A1 | 12/2001 | Fung et al. |
| 2001/0052127 A1 | 12/2001 | Seo et al. |
| 2002/0048450 A1 | 4/2002 | Zetts |
| 2002/0067432 A1 | 6/2002 | Kondo et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0164024 A1 | 11/2002 | Arakawa et al. |
| 2002/0169971 A1 | 11/2002 | Asano et al. |
| 2003/0002577 A1 | 1/2003 | Pinder |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0135742 A1 | 7/2003 | Evans |
| 2003/0142594 A1 | 7/2003 | Tsumagari et al. |
| 2003/0206717 A1 | 11/2003 | Yogeshwar et al. |
| 2004/0001594 A1 | 1/2004 | Krishnaswamy et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0076237 A1 | 4/2004 | Kadono et al. |
| 2004/0081333 A1 | 4/2004 | Grab et al. |
| 2004/0093494 A1 | 5/2004 | Nishimoto et al. |
| 2004/0101059 A1 | 5/2004 | Joch et al. |
| 2004/0107356 A1 | 6/2004 | Shamoon et al. |
| 2004/0268400 A1 | 12/2004 | Barde et al. |
| 2005/0013494 A1 | 1/2005 | Srinivasan et al. |
| 2005/0063541 A1 | 3/2005 | Candelore |
| 2005/0076232 A1 | 4/2005 | Kawaguchi |
| 2005/0144468 A1 | 6/2005 | Northcutt |
| 2005/0177741 A1 | 8/2005 | Chen et al. |
| 2005/0243912 A1 | 11/2005 | Kwon et al. |
| 2005/0265555 A1 | 12/2005 | Pippuri |
| 2006/0013568 A1 | 1/2006 | Rodriguez |
| 2006/0165163 A1 | 7/2006 | Burazerovic et al. |
| 2006/0268912 A1* | 11/2006 | Read ................... H04N 21/4305 370/412 |
| 2007/0047645 A1 | 3/2007 | Takashima |
| 2007/0067472 A1 | 3/2007 | Maertens et al. |
| 2007/0083467 A1 | 4/2007 | Lindahl et al. |
| 2007/0180051 A1 | 8/2007 | Kelly et al. |

(56) References Cited

U.S. PATENT DOCUMENTS

| | | | |
|---|---|---|---|
| 2008/0022350 A1* | 1/2008 | Hostyn | H04L 29/06027 725/139 |
| 2008/0086570 A1 | 4/2008 | Dey et al. | |
| 2008/0101718 A1 | 5/2008 | Yang et al. | |
| 2008/0137847 A1 | 6/2008 | Candelore et al. | |
| 2009/0010622 A1 | 1/2009 | Yahata et al. | |
| 2009/0013195 A1 | 1/2009 | Ochi et al. | |
| 2009/0077143 A1 | 3/2009 | Macy, Jr. | |
| 2009/0106082 A1 | 4/2009 | Senti et al. | |
| 2009/0132599 A1 | 5/2009 | Soroushian et al. | |
| 2009/0178090 A1 | 7/2009 | Oztaskent | |
| 2009/0249081 A1 | 10/2009 | Zayas | |
| 2009/0282162 A1 | 11/2009 | Mehrotra et al. | |
| 2009/0310819 A1 | 12/2009 | Hatano | |
| 2010/0118978 A1 | 5/2010 | Rodriguez et al. | |
| 2010/0142915 A1 | 6/2010 | Mcdermott et al. | |
| 2011/0010466 A1 | 1/2011 | Fan et al. | |
| 2011/0058675 A1 | 3/2011 | Brueck et al. | |
| 2011/0096828 A1 | 4/2011 | Chen et al. | |
| 2011/0103374 A1 | 5/2011 | Lajoie et al. | |
| 2011/0135090 A1 | 6/2011 | Chan et al. | |
| 2011/0145858 A1 | 6/2011 | Philpott et al. | |
| 2011/0173345 A1 | 7/2011 | Knox et al. | |
| 2011/0179185 A1 | 7/2011 | Wang et al. | |
| 2011/0197261 A1 | 8/2011 | Dong et al. | |
| 2011/0225314 A1* | 9/2011 | Leinonen | H04N 7/163 709/231 |
| 2011/0246661 A1 | 10/2011 | Manzari et al. | |
| 2011/0296048 A1 | 12/2011 | Knox et al. | |
| 2011/0302238 A1* | 12/2011 | Sood | H04N 21/4325 709/231 |
| 2011/0314130 A1 | 12/2011 | Strasman | |
| 2012/0005312 A1 | 1/2012 | Mcgowan et al. | |
| 2012/0042090 A1 | 2/2012 | Chen et al. | |
| 2012/0047542 A1 | 2/2012 | Lewis et al. | |
| 2012/0110120 A1 | 5/2012 | Willig et al. | |
| 2012/0167132 A1 | 6/2012 | Mathews et al. | |
| 2012/0177101 A1* | 7/2012 | van der Schaar | H04N 19/30 375/240.01 |
| 2012/0311174 A1 | 12/2012 | Bichot et al. | |
| 2012/0331167 A1 | 12/2012 | Hunt | |
| 2013/0013803 A1 | 1/2013 | Bichot et al. | |
| 2013/0080267 A1 | 3/2013 | McGowan | |
| 2014/0026052 A1* | 1/2014 | Thorwirth | H04L 65/611 715/721 |
| 2014/0140253 A1 | 5/2014 | Lohmar et al. | |
| 2014/0149557 A1 | 5/2014 | Lohmar et al. | |
| 2014/0250236 A1* | 9/2014 | Piepenbrink | H04L 47/26 709/231 |
| 2014/0282792 A1* | 9/2014 | Bao | H04L 65/80 725/116 |
| 2014/0307804 A1 | 10/2014 | Rodriguez et al. | |
| 2015/0006753 A1* | 1/2015 | Krikorian | H04N 19/164 709/231 |
| 2015/0288530 A1 | 10/2015 | Oyman | |
| 2015/0296205 A1 | 10/2015 | van der Schaar | |
| 2015/0334153 A1* | 11/2015 | Koster | H04L 65/65 709/219 |
| 2016/0255417 A1* | 9/2016 | Yamagishi | H04N 21/8456 725/110 |
| 2016/0337426 A1* | 11/2016 | Shribman | H04L 65/4084 |
| 2017/0188056 A1* | 6/2017 | Do | H04L 47/25 |
| 2018/0069909 A1* | 3/2018 | Suri | H04L 65/70 |

FOREIGN PATENT DOCUMENTS

| | | |
|---|---|---|
| CN | 103348336 A | 10/2013 |
| CN | 103731726 A | 4/2014 |
| CN | 110073341 A | 7/2019 |
| CN | 110073341 B | 11/2023 |
| EP | 1453319 A1 | 9/2004 |
| EP | 1283640 B1 | 10/2006 |
| EP | 1879347 A1 | 1/2008 |
| EP | 2180664 A1 | 4/2010 |
| EP | 2360923 A1 | 8/2011 |
| EP | 1879347 B1 | 5/2012 |
| EP | 2733936 A1 | 5/2014 |
| EP | 3510491 A1 | 7/2019 |
| EP | 3510491 B1 | 5/2021 |
| HK | 40008828 A | 6/2020 |
| HK | 40010466 A | 7/2020 |
| JP | 2008029005 A | 2/2008 |
| JP | 2011501489 A | 1/2011 |
| JP | 2015156604 A | 8/2015 |
| JP | 2016500504 A | 1/2016 |
| JP | 2016504797 A | 2/2016 |
| JP | 2019-530317 A | 10/2019 |
| JP | 2020156111 A | 9/2020 |
| JP | 6845921 B2 | 3/2021 |
| JP | 7166311 B2 | 10/2022 |
| KR | 20040039852 A | 5/2004 |
| KR | 20060106250 A | 10/2006 |
| KR | 10-2226095 B1 | 3/2021 |
| RU | 2328040 C2 | 6/2008 |
| WO | 2000049762 A2 | 8/2000 |
| WO | 2000049763 A1 | 8/2000 |
| WO | 2003047262 A2 | 6/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2005122025 A2 | 12/2005 |
| WO | 2009006302 A1 | 1/2009 |
| WO | 2009109976 A2 | 9/2009 |
| WO | 2011087449 A1 | 7/2011 |
| WO | 2011101371 A1 | 8/2011 |
| WO | 2011103364 A1 | 8/2011 |
| WO | 2015003302 A1 | 1/2015 |
| WO | 2018048818 A1 | 3/2018 |

OTHER PUBLICATIONS

"MPEG-4, Part 14, ISO/IEC 14496-14", Information technology—Coding of audio-visual objects, 18 pgs, Nov. 15, 2003.

Fielding et al., "Hypertext Transfer Protocol—HTTP1.1", Network Working Group, RFC 2616, Jun. 1999, 114 pgs.

Schulzrinne, H. et al., "Real Time Streaming Protocol (RTSP)", Internet Engineering Task Force, RFC 2326, Apr. 1998, 80 pgs.

International Search Report and Written Opinion for International Application No. PCT/US2017/050141, Search completed Oct. 23, 2017, Mailed Nov. 13, 2017, 10 Pgs.

International Preliminary Report on Patentability for International Application PCT/US2017/050141, Report issued Mar. 12, 2019, Mailed Mar. 21, 2019, 9 Pgs.

Extended European Search Report for European Application EP17849404.3, Report Completed Dec. 12, 2019, Mailed Dec. 19, 2019, 7 Pgs.

Information Technology—MPEG Systems Technologies—Part 7: Common Encryption in ISO Base Media File Format Files (ISO/IEC 23001-7), Apr. 2015, 24 pgs.

ISO/IEC 14496-12 Information technology—Coding of audio-visual objects—Part 12: ISO base media file format, Feb. 2004 ("MPEG-4 Part 12 Standard"), 62 pgs.

ISO/IEC 14496-12:2008(E) Informational Technology—Coding of Audio-Visual Objects Part 12: ISO Base Media File Format, Oct. 2008, 120 pgs.

ISO/IEC FCD 23001-6 MPEG systems technologies Part 6: Dynamic adaptive streaming over HTTP (DASH), Jan. 28, 2011, 86 pgs.

Microsoft Corporation, Advanced Systems Format (ASF) Specification, Revision 01.20.03, Dec. 2004, 121 pgs.

MPEG-DASH presentation at Streaming Media West 2011, Nov. 2011, 14 pgs.

Pomelo, LLC Tech Memo, Analysis of Netflix's Security Framework for 'Watch Instantly' Service, Mar.-Apr. 2009, 18 pgs.

Server-Side Stream Repackaging (Streaming Video Technologies Panorama, Part 2), Jul. 2011, 15 pgs.

Text of ISO/IEC 23001-6: Dynamic adaptive streaming over HTTP (DASH), Oct. 2010, 71 pgs.

(56) References Cited

OTHER PUBLICATIONS

Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Information Technology—Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Alattar et al., A.M., "Improved selective encryption techniques for secure transmission of MPEG video bit-streams", In Proceedings 1999 International Conference on Image Processing (Cat. 99CH36348), vol. 4, IEEE, 1999, pp. 256-260.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Bocharov et al, "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002, 5 pgs.

Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, 4 pgs.
Fecheyr-Lippens, "A Review of HTTP Live Streaming", Jan. 2010, 38 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari, "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al, "A Deblocking Filter with Two Separate Modes in Block-based Video Coding", IEEE transactions on circuits and systems for video technology, vol. 9, No. 1, 1999, pp. 156-160.
Kim et al., "Tree-Based Group Key Agreement", Feb. 2004, 37 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.

(56) References Cited

OTHER PUBLICATIONS

Meier, "Reduction of Blocking Artifacts in Image and Video Coding", IEEE Transactions on Circuits and Systems for Video Technology, vol. 9, No. 3, Apr. 1999, pp. 490-500.
Nelson, "Smooth Streaming Deployment Guide", Microsoft Expression Encoder, Aug. 2010, 66 pgs.
Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (presented in 2 parts).
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP-Standards and Design Principles", Proceedings of the second annual ACM conference on Multimedia, Feb. 2011, pp. 133-145.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, 6 pgs.
Ventura, Guillermo Albaida, "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Zhu et al., "Video stream network transmission based on HTTP", Journal of Nanjing University of Post and Communications (Natural Science Version), No. 03, Jun. 29, 2016.

* cited by examiner

SYSTEMS AND METHODS FOR ADAPTIVE BUFFERING FOR DIGITAL VIDEO STREAMING

CROSS-REFERENCE TO RELATED APPLICATIONS

The present application claims priority to U.S. Application No. 62/385,065, entitled Systems and Methods for Adaptive Buffering for Digital Video Streaming, filed Sep. 8, 2016, the disclosure of which is incorporated herein by reference in its entirety.

FIELD OF THE INVENTION

The present invention generally relates to adaptive streaming and more specifically relates to systems that adaptively buffer streaming of digital video.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Washington, and Flash Dynamic Streaming developed by Adobe Systems Incorporated of San Jose, California. HTTP Adaptive Bitrate Streaming developed by Apple Computer Incorporated of Cupertino, California implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e. is based upon the Matroska container format, but includes elements that are not specified within the Matroska format).

To provide a consistent means for the delivery of media content over the Internet, the International Organization for Standardization (ISO) and the International Electrotechnical Commission (IEC) have put forth the Dynamic Adaptive Streaming over HTTP (DASH) standard. The DASH standard specifies formats for the media content and the description of the content for delivery of MPEG content using HTTP. In accordance with DASH, each component of media content for a presentation is stored in one or more streams. Each of the streams is divided into segments. A Media Presentation Description (MPD) is a data structure that includes information about the segments in each of the stream and other information needed to present the media content during playback. A playback device uses the MPD to obtain the components of the media content using adaptive bit rate streaming for playback.

SUMMARY OF THE INVENTION

Systems and methods for adaptive buffering for digital video streaming in accordance with some embodiments of the invention are illustrated.

One embodiment includes a playback device comprising a memory; a network interface; and a processor that reads instructions stored in the memory that directs the processor to: download digital video content in a buffer of a playback device; receive a minimum buffer time from the digital video content; play the digital video content at a slow motion speed using the playback device; reduce the minimum buffer time by a slow motion playback speed factor; continue playing the digital video content at the slow motion speed until the reduced minimum buffer time is reached using the playback device; and play the digital video content at a speed faster than the slow motion speed once the minimum buffer time is reached using the playback device.

In a further embodiment, downloading the digital video content further comprises: request a manifest; extract the location of a container file containing encoded media from the manifest; and request portions of the container file containing encoded media.

In another embodiment, compare the downloaded encoded media in the buffer to the reduced minimum buffer time; and play the encoded media using the playback device when the encoded media exceeds the reduced minimum buffer time.

In a still further embodiment, the minimum buffer time is the amount of time to download a minimum amount of media to store in a buffer to avoid disruption of playback.

In still another embodiment, the minimum buffer time is stored in the digital video content in a location selected from the group consisting of a manifest, an index file, and a file pointed to by the digital video content.

In a yet further embodiment, the digital video content further includes a manifest and a plurality of container files that each contain an alternative digital video stream.

In yet another embodiment, the alternative digital video stream is a digital video stream encoded at a different bit rate.

In a further embodiment again, the digital video content is a DASH standard file and the minimum buffer time is stored in a media presentation description data structure.

In another embodiment again, reducing the minimum buffer time further comprises decreasing the digital video content to fill a buffer by playing available digital video content at a reduced speed.

In a further additional embodiment, the slow motion playback speed factor changes the amount of the digital video content consumed for playback.

In another additional embodiment, the slow motion speed corresponds to the slow motion playback speed factor.

In a still yet further embodiment, downloading digital video content in a buffer of a playback device using a processor that reads instructions stored in memory; receiving a minimum buffer time from the digital video content using the processor that reads the instructions stored in memory; playing the digital video content at a slow motion speed using the playback device and the processor that reads the instructions stored in memory; reducing the minimum buffer time by a slow motion playback speed factor using the playback device using the processor that reads the instructions stored in memory; and playing the digital video content at a speed faster than the slow motion speed once the minimum buffer time is reached using the playback device and the processor that reads the instructions stored in memory.

In still yet another embodiment, downloading the digital video content further comprises: requesting a manifest using the processor that reads the instructions stored in memory; extracting the location of a container file containing encoded media from the manifest using the processor that reads the instructions stored in memory; and requesting portions of the container file containing encoded media using the processor that reads the instructions stored in memory.

In a still further embodiment again, comparing the downloaded encoded media in the buffer to the reduced minimum buffer time using the processor that reads the instructions stored in memory; and playing the encoded media using the playback device when the encoded media exceeds the reduced minimum buffer time using the processor that reads the instructions stored in memory.

In still another embodiment again, the minimum buffer time is the amount of time to download a minimum amount of media to store in a buffer to avoid disruption of playback.

In a further embodiment, the minimum buffer time is stored in the digital video content in a location selected from the group consisting of a manifest, an index file, and a file pointed to by the digital video content.

In another embodiment, the digital video content further includes a manifest and a plurality of container files that each contain an alternative digital video stream.

In a still further embodiment, the alternative digital video stream is a digital video stream encoded at a different bit rate In still another embodiment, the digital video content is a DASH standard file and the minimum buffer time is stored in a media presentation description data structure.

In a yet further embodiment, reducing the minimum buffer time further comprises decreasing the digital video content to fill a buffer by playing available digital video content at a reduced speed.

In yet another embodiment, the slow motion playback speed factor changes the amount of the digital video content consumed for playback.

In a further embodiment again, the slow motion speed corresponds to the slow motion playback speed factor.

DETAILED DISCLOSURE OF THE INVENTION

Turning now to the drawings, systems and methods for providing adaptive buffering of digital video content during playback of video content in accordance with many embodiments of the invention are illustrated. In several embodiments, a minimum amount of media is desired to be stored in a buffer prior to commencement of playback of video in order to reduce the likelihood of disruption of playback to acceptable levels. In various embodiments, the amount of time to download this minimum amount of media can be referred to as a minimum buffer time (MBT). The MBT can be stored in Media Presentation Description (MPD) data structure in the DASH standard. In several embodiments, the MBT can be contained in the manifest and/or in the index file of the MPD data structure. In many other embodiments, the MBT can be contained in a file pointed to by the MPD data structure. It should be readily apparent that the use of the DASH standard is merely illustrative, and a minimum buffer time (or its equivalent) can be stored in various locations in media manifests and/or in other media file types.

Changes in playback speed (i.e. slow motion and/or fast forward) generally changes the amount of media consumed for playback. Slow motion playback reduces the amount of media consumed in a given amount of time compared to playback at normal speed. In several embodiments of the present invention, reducing playback speed can enable a player to commence playback with less buffered media and without significantly increasing the likelihood of interruption in playback.

As an illustrative example, media in accordance with several embodiments of the invention has a MBT of 8 seconds. This media would generally buffer 8 seconds of media prior to commencement of playback. If the same media is played back in slow motion at a rate of ½, the same media generally can commence playback based upon a reduced MBT of 4 seconds. In the alternative, if the same media is played back in slow motion at a rate of ¼, the same media can commence playback based upon a reduced MBT of 2 seconds. Additionally, if media is played back at a slow motion rate of ⅛, the same media can commence playback based upon a reduced MBT of 1 second. It should be readily apparent to one having ordinary skill in the art that these are merely examples and different media can be played at different rates.

Figure 1:
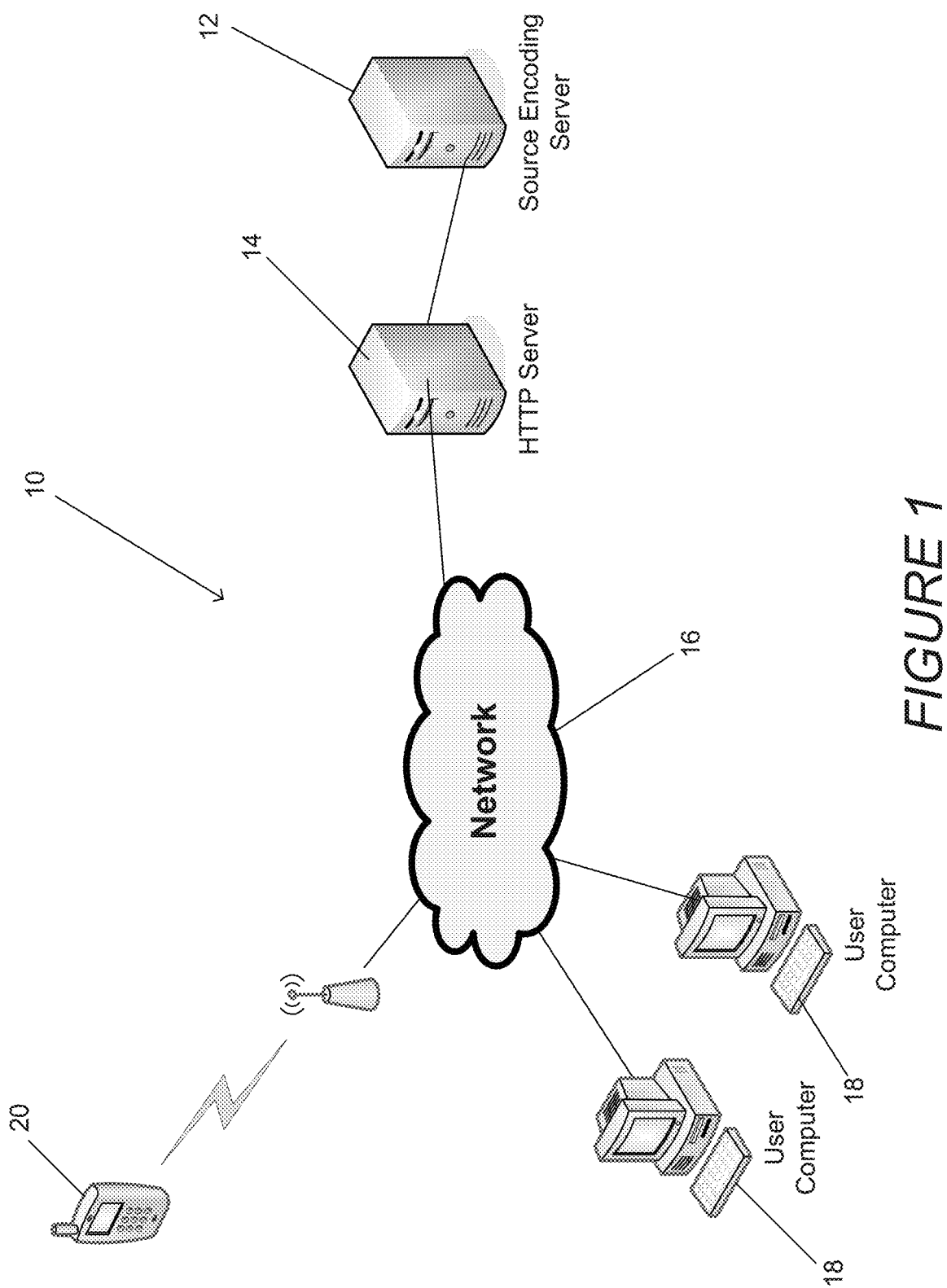
FIG. 1 is a diagram illustrating a network diagram of an adaptive bitrate streaming system in accordance with an embodiment of the invention.

The encoding of source video for use in adaptive bitrate streaming systems that provide audio playback during trick-play modes and the playback of the media content in a trick-play mode using adaptive bitrate streaming in accordance with some embodiments of the invention is discussed further below Adaptive Streaming System Architectures Turning now to the FIG. 1, an adaptive streaming system including playback devices that provide adaptive buffering in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams and/or metadata information, at least a plurality of which are alternative streams. Alternative streams are streams that encode the same media content in different ways. In many instances, alternative streams encode media content (such as, but not limited to, video content and/or audio content) at different maximum bitrates. In a number of embodiments, the alternative streams of video content are encoded with different resolutions and/or at different frame rates. The top level index file and the container files are uploaded to an HTTP server 14. A variety of playback devices can then use HTTP or another appropriate stateless protocol to request portions of the top level index file, other index files, and/or the container files via a network 16 such as the Internet.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

Playback Devices

Figure 2:
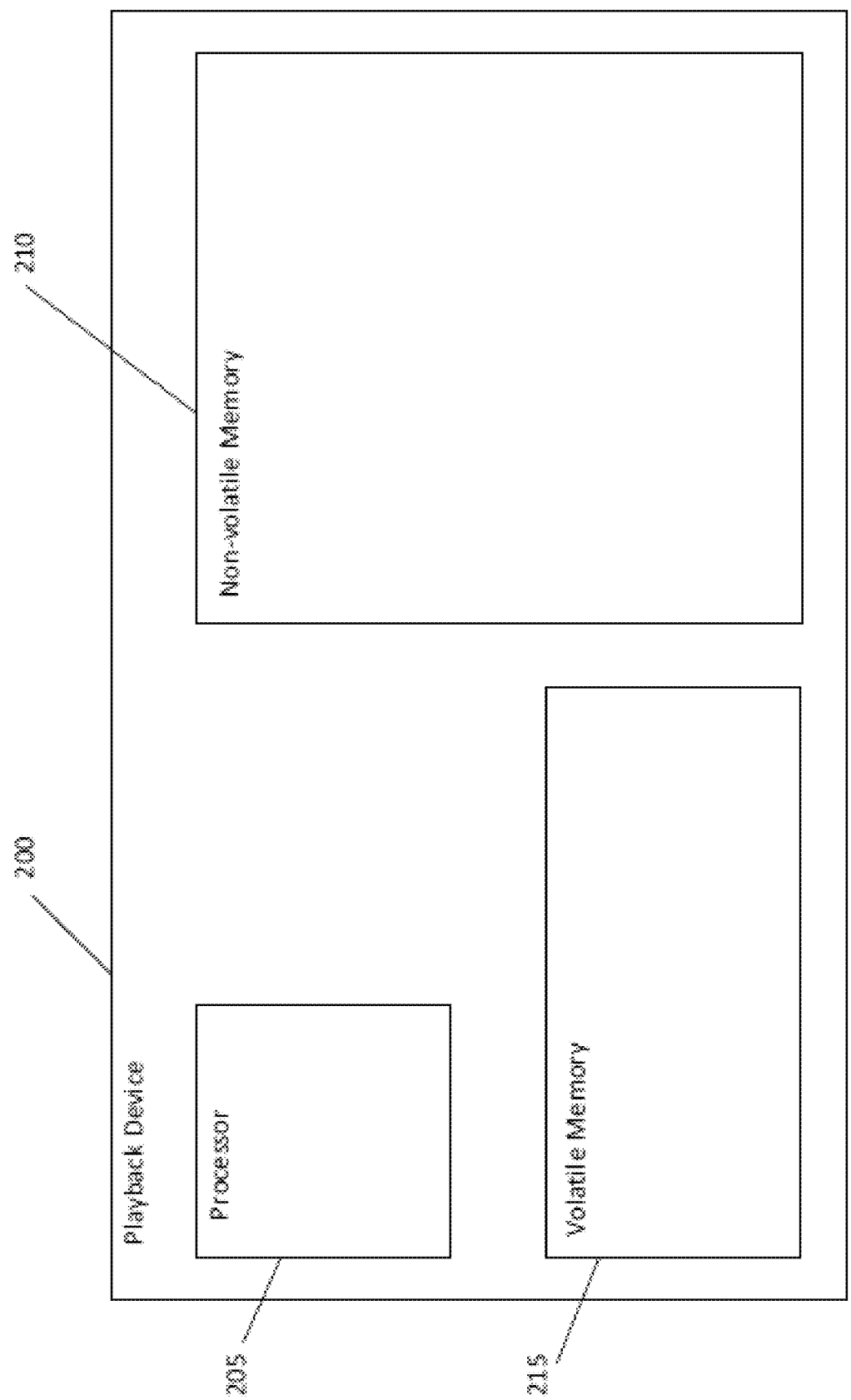
FIG. 2 is a diagram illustrating a playback device of an adaptive bitrate streaming system in accordance with an embodiment of the invention.

Some processes for providing methods and configuring systems in accordance with embodiments of this invention are executed by a playback device. The relevant components in a playback device that can perform the processes in accordance with an embodiment of the invention are shown in FIG. 2. One skilled in the art will recognize that playback device may include other components that are omitted for brevity without departing from described embodiments of this invention. The playback device 200 includes a processor 205, a non-volatile memory 210, and a volatile memory 215.

The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In accordance with some embodiments, these instructions are included in a playback application that performs the playback of media content on a playback device. In accordance with various embodiments, the playback device software and/or firmware can be stored in any of a variety of non-transitory computer readable media appropriate to a specific application.

Servers

Figure 3:
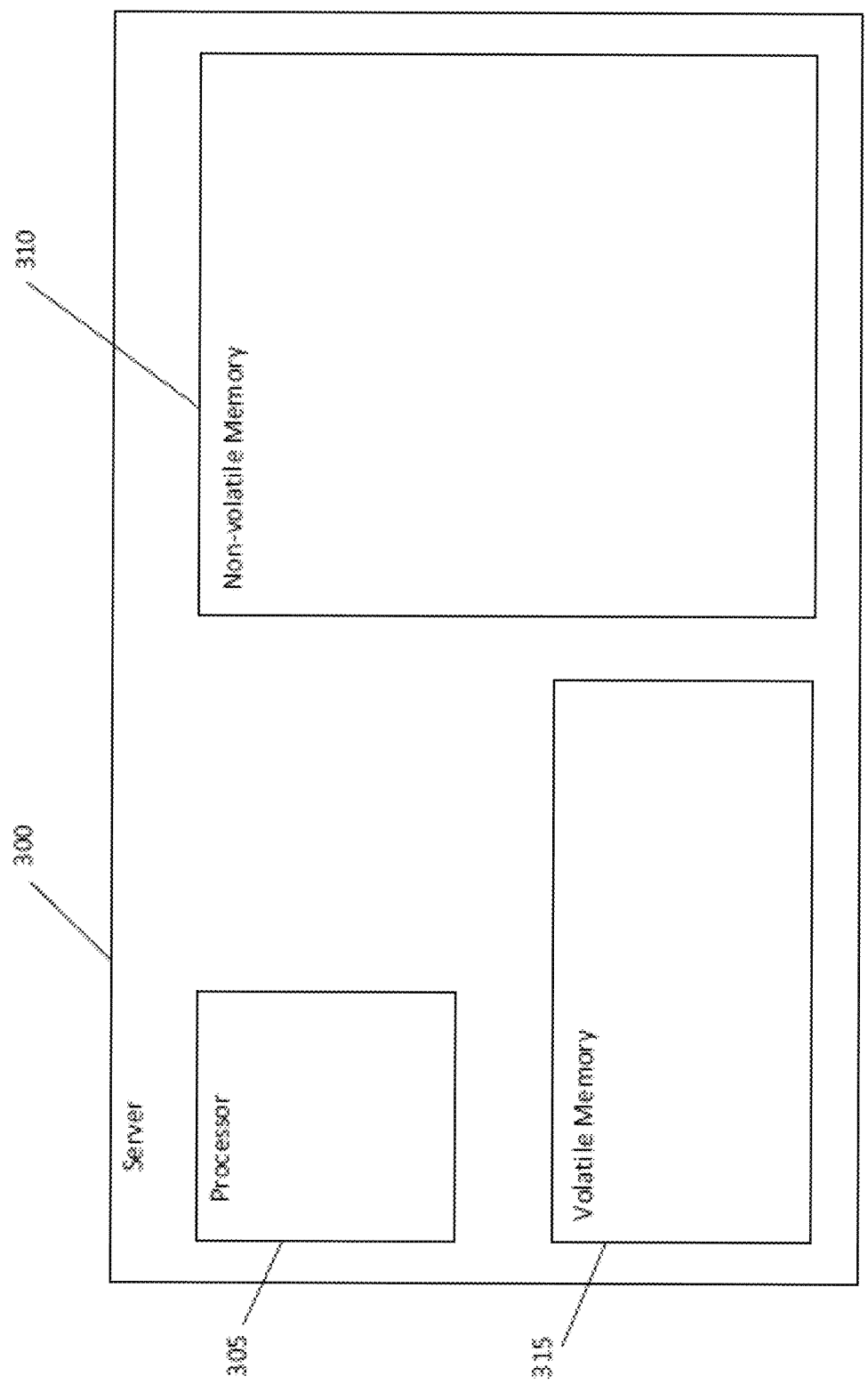
FIG. 3 is a diagram illustrating a server of an adaptive bitrate streaming system in accordance with an embodiment of the invention.

Various processes performed within adaptive streaming systems in accordance with different embodiments of this invention are executed by the HTTP server; source encoding server; and/or local and network time servers. The relevant components in a server that performs one or more of these processes in accordance with embodiments of the invention are shown in FIG. 3. One skilled in the art will recognize that a server may include other components that are omitted for brevity without departing from the described embodiments of this invention. The server 300 includes a processor 305, a non-volatile memory 310, and a volatile memory 315. The processor 305 is a processor, microprocessor, controller, or a combination of processors, microprocessor, and/or controllers that performs instructions stored in the volatile 315 or non-volatile memory 310 to manipulate data stored in the memory. The non-volatile memory 310 can store the processor instructions utilized to configure the server 300 to perform processes including processes in accordance with embodiments of the invention and/or data for the processes being utilized. In accordance with some embodiments, instructions to perform encoding of media content are part of an encoding application. In accordance with various embodiments, the server software and/or firmware can be stored in any of a variety of non-transitory computer readable media appropriate to a specific application. Although a specific server is illustrated in FIG. 3, any of a variety of server configured to perform any number of processes can be utilized in accordance with embodiments of the invention. Adaptive buffering processes in accordance with many embodiments of the invention are described below.

Adaptive Buffering Processes

Figure 4:
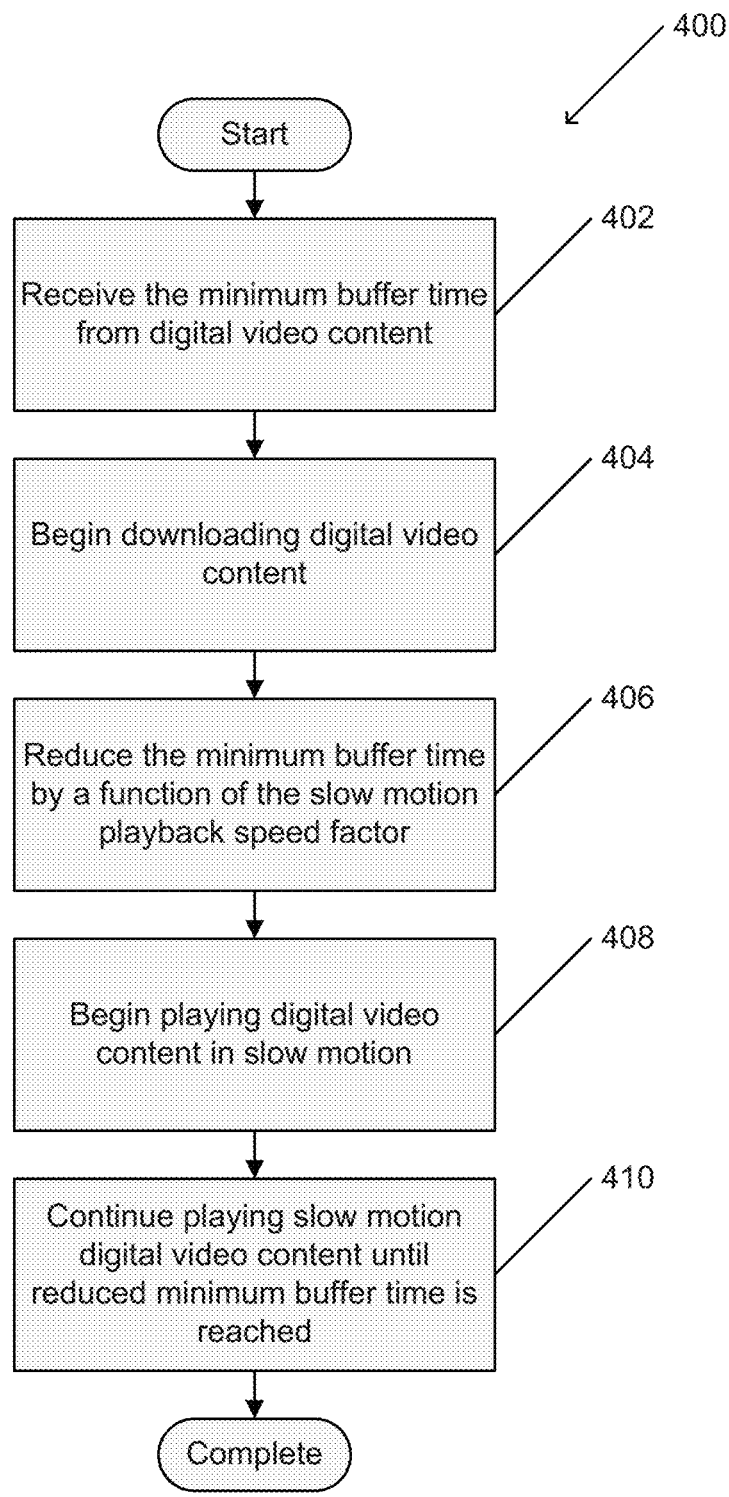
FIG. 4 is a flowchart illustrating an adaptive buffering process in accordance with an embodiment of the invention.

Processes for adaptive buffering in accordance with various embodiments of the invention are illustrated in FIG. 4. The process 400 includes receiving (402) the minimum buffer time from digital video content. Digital video content can be encoded and stored in any of a variety of formats including (but not limited to) the DASH standard, MPEG-4, and/or the Matroska container. A playback device can then commence downloading (404) digital video content.

The minimum buffer time is reduced (406) as a function of the slow motion playback speed factor. In many embodiments, a function of the slow motion playback speed factor can change the amount of media consumed for playback. In various embodiments, the slower the playback speed, the greater the reduction of the minimum buffer time. As an illustrative example, media in accordance with several embodiments of the invention has a MBT of 8 seconds. This media would generally buffer 8 seconds of media prior to commencement of playback. If the same media is played back in slow motion at a rate of ½, the same media generally can commence playback based upon a reduced MBT of 4 second. In the alternative, if the same media is played back in slow motion at a rate of ¼, the same media generally can commence playback based upon reduced MBT of 2 seconds. Additionally, if media is played back at a slow motion rate of ⅛, the same media generally can commence playback based upon reduced MBT of 1 second. It should be readily apparent to one having ordinary skill in the art that these are merely examples and different media can be played at different rates.

The digital video content begins playing (408) in slow motion. In many embodiments, the digital video content begins playing once the MBT buffer is full. In several other embodiments, playback begins before the MBT buffer is full. As an illustrative example, playback may begin when the MBT buffer is 75% full when the available bandwidth is much higher than the bit rate of the digital video content. It should be readily apparent to one having ordinary skill in the art that this is merely an example and playback of digital video content can depend on various factors in the system including (but not limited to) bandwidth, bit rate, the MBT buffer size, the playback speed factor, and/or system hardware requirements.

Slow motion digital video content continues playing (410) until the reduced minimum buffer time is reached. Although a variety of processes for adaptively buffering digital video content are described above with respect to FIG. 4, any of a variety of processes capable of reducing the minimum buffer time can be utilized as appropriate to the requirements of specific applications in accordance with various embodiments of the invention.

In several embodiments of the invention, slow motion playback speed and/or audio playback can increase (or ramp up) as the MBT increases. In many embodiments of the invention, the playback speed and/or audio playback can ramp up as the MBT increases such that the playback speed and/or audio playback will be at full speed when the MBT is reached.

In other embodiments of the invention, processes can detect when a buffer is falling below a threshold and gradually reduce playback speed and/or audio playback until the buffer can recover. This can attempt to delay a stall in the playback of a video stream and/or audio stream with a gradual decay in playback (as opposed to a video and/or audio stream that plays and then stalls). Generally, this can occur in the context of delaying a down switch to a lower bitrate and/or lower quality video stream. Alternatively, if a video and/or audio stream is at the lowest quality stream, playback can be slowed until better bandwidth can be achieved. In general, embodiments of the invention can delay a stream playback stalling as long as possible and gradually decay through slow motion playback in accordance with various embodiments of the invention instead of going from playback to stall.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A playback device comprising:
   a memory, containing a playback application;
   a network interface; and
   a processor, wherein the playback application configures the processor to:
   receive a manifest file comprising information on a plurality of alternative streams, each alternative stream having a different bitrate from the other streams;
   receive a minimum buffer time parameter for each alternative stream from the manifest file, wherein each alternative stream's minimum buffer time parameter is a predetermined minimum playback time of an alternative stream's digital video content to be stored in a buffer prior to commencing playback of digital video content to prevent disruptions of playback of digital video content at an alternative stream's normal speed of playback;
   determine a reduced minimum buffer time parameter based on the received minimum buffer time parameter at a normal speed for at least one alternative stream from the manifest file and a slow motion speed,
     wherein the reduced minimum buffer time parameter is determined by multiplying the minimum buffer time parameter at a normal speed for the at least one alternative stream by the slow motion speed;
   download the digital video content of a first alternative stream into a buffer of the playback device, where the minimum buffer time parameter of the buffer is the reduced minimum buffer time parameter; and
   when the playback time of an amount of digital video content of the first alternative stream within the buffer initially reaches the reduced minimum buffer time parameter, commence playback of the digital video content, wherein the speed of commenced playback is the slow motion speed.

2. The playback device of claim 1, wherein downloading the digital video content further comprises:
   extracting a location of a container file containing encoded media from the manifest; and
   requesting portions of the container file containing encoded media.

3. The playback device of claim 1, wherein the digital video content is a DASH standard file and the manifest is in a media presentation description data format.

4. The playback device of claim 1, wherein the slow motion playback speed changes the amount of the digital video content consumed for playback.

5. The playback device of claim 1, wherein downloading the digital video content further comprises:
   performing one of two options when the amount of digital video content in the buffer falls below a threshold:
     when the first alternative stream is a lowest bitrate stream of the plurality of alternative streams, then further decrease the speed playback; and
     when the first alternative stream is not the lowest bitrate stream of the plurality of alternative streams, then down switch to a second alternative stream having a lower bitrate.

6. A method for providing playback of digital video content comprising:
   configuring a processor, using a playback application stored in a memory communicatively coupled to the processor, to perform the steps of:

receiving a manifest file using a processor that reads instructions stored in memory, wherein the manifest file comprises information on a plurality of alternative streams, each alternative stream having a different bitrate from the other streams;

receiving a minimum buffer time parameter for each alternative stream from the manifest file using a processor that reads instructions stored in memory, wherein each alternative stream's minimum buffer time parameter is a predetermined minimum playback time of an alternative stream's digital video content to be stored in a buffer prior to commencing playback of digital video content to prevent disruptions of playback of the digital video content at an alternative stream's normal speed of playback;

determining a reduced minimum buffer time parameter based on the received minimum buffer time parameter at a normal speed for at least one alternative stream from the manifest file and a slow motion speed using the processor that reads the instructions stored in memory,
wherein the reduced minimum buffer time parameter is determined by multiplying the minimum buffer time parameter at a normal speed for the at least one alternative stream by the slow motion speed;

downloading the digital video content of a first alternative stream into a buffer of a playback device using the processor that reads the instructions stored in memory, where the minimum buffer time parameter of the buffer is the reduced minimum buffer time parameter; and when the playback time an amount of digital video content of the first alternative stream within the buffer initially reaches the reduced minimum buffer time parameter, commencing playback of the digital video content using the playback device and the processor that reads the instructions stored in memory, wherein the speed of commenced playback is the slow motion speed.

7. The method for providing playback of digital video content of claim 6, wherein downloading the digital video content further comprises:
extracting a location of a container file containing encoded media from the manifest using the processor that reads the instructions stored in memory; and
requesting portions of the container file containing encoded media using the processor that reads the instructions stored in memory.

8. The method for providing playback of digital video content of claim 6, wherein the digital video content is a DASH standard file and the manifest is in a media presentation description data format.

9. The method for providing playback of digital video content of claim 6, wherein the slow motion playback speed changes the amount of the digital video content consumed for playback.

10. The method for providing playback of digital video content of claim 6, wherein downloading the digital video content further comprises:
performing one of two options when the amount of digital video content in the buffer falls below a threshold:
when the first alternative stream is a lowest bitrate stream of the plurality of alternative streams, then further decrease the speed playback; and
when the first alternative stream is not the lowest bitrate stream of the plurality of alternative streams, then down switch to a second alternative stream having a lower bitrate.

11. A non-transitory machine readable medium for providing playback of digital video content, the non-transitory machine readable medium containing a playback application comprising processor instructions, where execution of the instructions by a processor causes the processor to perform a process comprising:
receiving a manifest file using a processor that reads the instructions stored in memory, wherein the manifest file comprises information on a plurality of alternative streams, each alternative stream having a different bitrate from the other streams;

receiving a minimum buffer time parameter for each alternative stream from the manifest file using a processor that reads instructions stored in memory, wherein each alternative stream's minimum buffer time parameter is a predetermined minimum playback time of an alternative stream's digital video content to be stored in a buffer prior to commencing playback of digital video content to prevent disruptions of playback of the digital video content at an alternative stream's normal speed of playback;

determining a reduced minimum buffer time parameter based on the received minimum buffer time parameter at a normal speed for at least one alternative stream from the manifest file and a slow motion speed using the processor that reads the instructions stored in memory,
wherein the reduced minimum buffer time parameter is determined by multiplying the minimum buffer time parameter at a normal speed for the at least one alternative stream by the slow motion speed;

downloading the digital video content of a first alternative stream into a buffer of a playback device using the processor that reads the instructions stored in memory, where the minimum buffer time parameter of the buffer is the reduced minimum buffer time parameter; and when the playback time of an amount of digital video content of the first alternative stream within the buffer initially reaches the reduced minimum buffer time parameter, commencing playback of the digital video content using the playback device and the processor that reads the instructions stored in memory, wherein the speed of commenced playback is the slow motion speed.

12. The non-transitory machine readable medium of claim 11, wherein downloading the digital video content further comprises:
extracting a location of a container file containing encoded media from the manifest using the processor that reads the instructions stored in memory; and
requesting portions of the container file containing encoded media using the processor that reads the instructions stored in memory.

13. The non-transitory machine readable medium of claim 11, wherein the digital video content is a DASH standard file and the manifest is in a media presentation description data format.

14. The non-transitory machine readable medium of claim 11, wherein the slow motion playback speed changes the amount of the digital video content consumed for playback.

15. The non-transitory machine readable medium of claim 11, wherein downloading the digital video content further comprises:
   performing one of two options when the amount of digital video content in the buffer falls below a threshold:
      when the first alternative stream is a lowest bitrate stream of the plurality of alternative streams, then further decrease the speed playback; and
      when the first alternative stream is not the lowest bitrate stream of the plurality of alternative streams, then down switch to a second alternative stream having a lower bitrate.

\* \* \* \* \*